US009224270B2

(12) United States Patent
Lee et al.

(10) Patent No.: US 9,224,270 B2
(45) Date of Patent: Dec. 29, 2015

(54) GAMING MACHINE AND METHOD OF ALLOWING PLAYERS TO PLAY GAMING MACHINES

(71) Applicant: Konami Gaming, Inc., Las Vegas, NV (US)

(72) Inventors: Arthur Lee, Las Vegas, NV (US); Jason Gilmore, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 13/793,680

(22) Filed: Mar. 11, 2013

(65) Prior Publication Data

US 2013/0260863 A1 Oct. 3, 2013

(30) Foreign Application Priority Data

Mar. 27, 2012 (AU) ................................ 2012201785

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/3267* (2013.01)

(58) Field of Classification Search
CPC ... G07F 17/32; G07F 17/323; G07F 17/3211; G07F 17/3265
See application file for complete search history.

(56) References Cited

U.S. PATENT DOCUMENTS

| | | | | |
|---|---|---|---|---|
| 7,878,903 | B2 * | 2/2011 | Chan | 463/31 |
| 8,512,127 | B2 * | 8/2013 | Jaffe et al. | 463/21 |
| 2003/0013517 | A1 | 1/2003 | Bennett et al. | |
| 2003/0087687 | A1 * | 5/2003 | Locke et al. | 463/20 |
| 2004/0048646 | A1 | 3/2004 | Visocnik | |
| 2005/0054423 | A1 | 3/2005 | Wadleigh | |
| 2006/0247002 | A1 * | 11/2006 | Yoshimi et al. | 463/20 |
| 2007/0015565 | A1 * | 1/2007 | Chan | 463/20 |
| 2008/0146319 | A1 * | 6/2008 | Yoshizawa | 463/21 |
| 2009/0280887 | A1 | 11/2009 | Yoshizawa | |
| 2011/0201406 | A1 * | 8/2011 | Jaffe et al. | 463/21 |
| 2012/0190438 | A1 * | 7/2012 | Bartosik et al. | 463/31 |
| 2012/0295688 | A1 * | 11/2012 | Watkins et al. | 463/20 |
| 2013/0190068 | A1 * | 7/2013 | Burghard et al. | 463/20 |

OTHER PUBLICATIONS

Patent Examination Report No. 5 (AU 2012201785)—Date of Issue Dec. 17, 2013.
Examiner's First Report (May 14, 2013).
(Continued)

*Primary Examiner* — James S McClellan
*Assistant Examiner* — Kevin Carter
(74) *Attorney, Agent, or Firm* — Howard & Howard Attorneys PLLC

(57) ABSTRACT

A slot game is provided. A display device displays a plurality of reels. During the slot game the reels are spun and an outcome of the game is randomly determined. The outcome of the game is displayed on the display device in a grid comprised of a plurality of symbol positions in a predetermined arrangement. One of the symbols from a corresponding reel are displayed at each symbol position. The spinning reels are visible in the grid during play of the game. The controller awards the player an award as a function of the wager, the outcome of the game and a predetermined paytable. A first one of the reels contains a stack of adjacent, similar symbols. The stack of adjacent similar symbols are displayed with a first single graphic overlay.

34 Claims, 10 Drawing Sheets

(56) References Cited

OTHER PUBLICATIONS

Patent Examination Report No. 2 (Jul. 3, 2012).
Patent Examination Report No. 3 (Nov. 7, 2012).
Patent Examination Report No. 4 (Apr. 4, 2013).
Patent Examination Report No. 1 (AU 20144200752); Date of Issue: May 4, 2015.
Patent Examination Report No. 4 (AU 2013205526); Date of Issue: Mar. 19, 2015.

* cited by examiner

GAMING MACHINE AND METHOD OF ALLOWING PLAYERS TO PLAY GAMING MACHINES

CROSS-REFERENCE TO RELATED APPLICATION

This application claims priority to Australian Patent Application No. 2012201785, filed Mar. 27, 2012, the disclosure of which is hereby incorporated by reference in its entirety.

FIELD OF THE INVENTION

The subject matter disclosed herein relates generally to video gaming machines and more particularly, to an apparatus and method for allowing players to play gaming machines.

BACKGROUND OF THE INVENTION

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options.

At least some known gaming machines include a video display device to display a reel game that includes a plurality of reels, wherein each reel includes a plurality of symbols. During game play, the gaming machine accepts a wager from a player to initiate a game, and randomly generates an outcome of the game. The gaming machine spins the reels, and sequentially stops each reel to display the generated combination of symbols on the reels. The gaming machine then awards the player an award if the generated outcome is a winning outcome.

New features are necessary to appeal to player interest and enhance excitement in order to entice longer play and satisfy demands of operators for interesting games and increased profitability. The present invention is directed to satisfying these needs.

SUMMARY OF THE INVENTION

In one aspect of the present invention, a method of providing a slot game to a player is provided. The slot game includes a plurality of reels. Each reel has a plurality of game symbols in a predetermined order. The method includes the steps of allowing the player to make a wager on the game, initiating the game and responsively spinning the reels, and randomly determining an outcome of the game and responsively stopping the reels to display the outcome of the game. The outcome of the game is displayed in a grid comprised of a plurality of symbol positions in a predetermined arrangement. One of the symbols from a corresponding reel is displayed at each symbol position. The spinning reels are visible in the grid during play of the game. The method further includes the step of awarding the player an award as a function of the wager, the outcome of the game and a predetermined paytable. One of the reels contains a stack of adjacent, similar symbols. The stack of adjacent similar symbols being displayed with a first single graphic overlay.

In another aspect of the present invention, a gaming machine for providing a slot game to a player is provided. The gaming machine includes a display device and a controller. The display device is configured to display a plurality of reels. Each reel has a plurality of game symbols in a predetermined order. The controller allows the player to make a wager on the game, initiates the game and responsively spins the reels, randomly determines an outcome of the game and responsively stops the reels to display the outcome of the game. The outcome of the game is displayed on the display device in a grid comprised of a plurality of symbol positions in a predetermined arrangement. One of the symbols from a corresponding reel are displayed at each symbol position. The spinning reels are visible in the grid during play of the game. The controller awards the player an award as a function of the wager, the outcome of the game and a predetermined paytable. A first one of the reels contains a stack of adjacent, similar symbols. The stack of adjacent similar symbols are displayed with a first single graphic overlay.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

Figure 1:
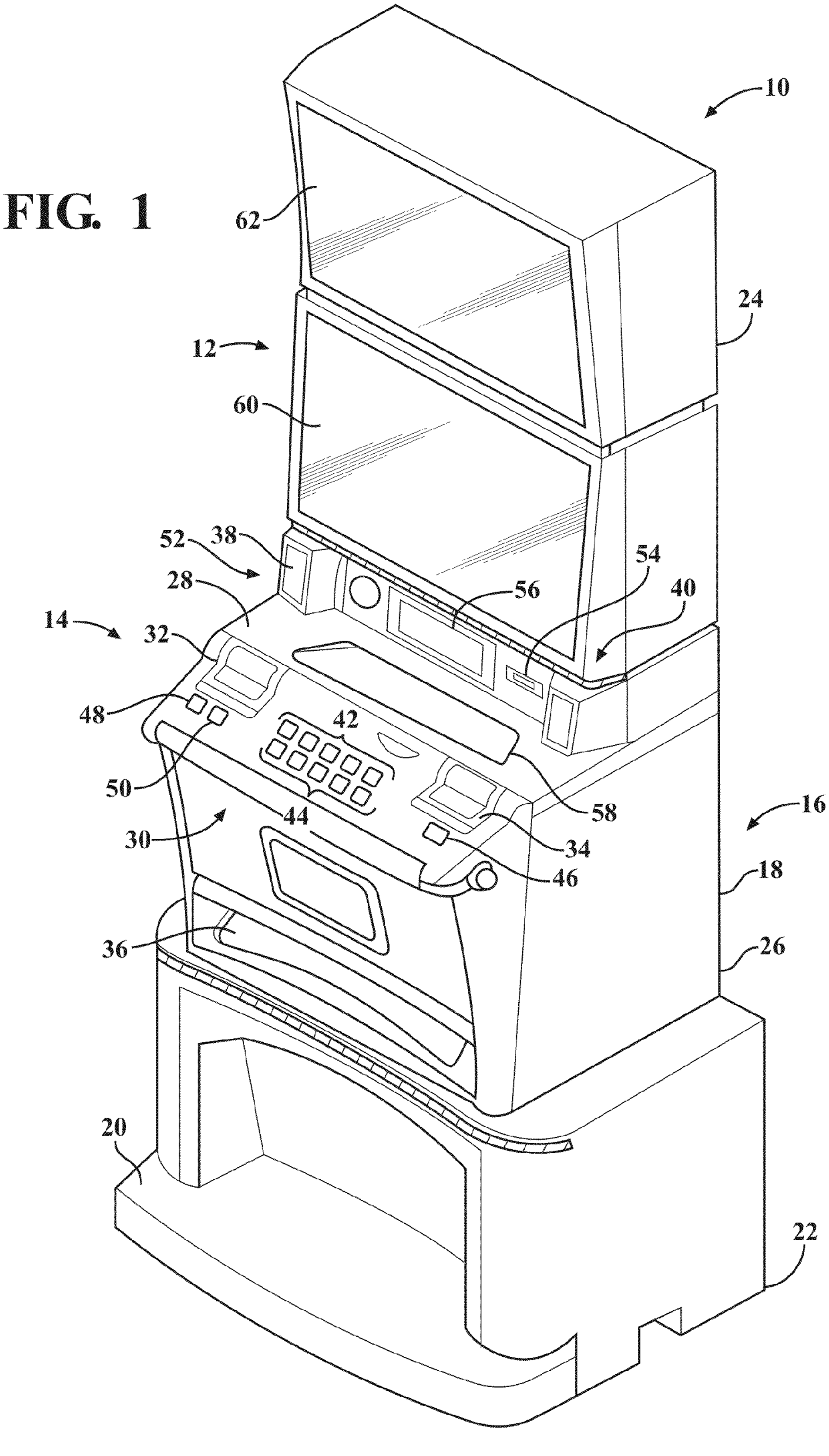
FIG. 1 is a perspective view of an exemplary gaming machine of the present invention.

With reference to the drawings and in operation, the present invention overcomes at least some of the disadvantages of known gaming machines by providing a gaming machine 10 that displays an anticipation event associated with a potential winning outcome and/or bonus feature during game play, and modifies the probability of the anticipation event occurring during subsequent game plays. More specifically, the gaming machine 10 initiates a gaming session, generates a first primary game outcome, and determines if an anticipation event triggering condition has occurred in the first primary game outcome based on an anticipation event probability. The gaming machine 10 also calculates the number of anticipation events that have occurred during the gaming session, and calculates a modified anticipation event probability that is used during a subsequent second primary game that is played by the player. By displaying an anticipation event that is associated with the potential winning outcome and/or the bonus feature, the player's interest and anticipation in the outcome is increased. In addition, by modifying the probability of the anticipation event occurring during subsequent game plays, the enjoyment of the game play is improved, and the amount of time that the gaming machine is played by patrons of a gaming establishment is thereby increased.

In general, the gaming machine 10 allows a player to play a plurality of slot games. The gaming machine 10 allows a player to initiate a gaming session, displays a slot game, accepts a wager on the slot game, generates an outcome of the slot game, and awards the player an award if the slot game outcome is a winning outcome.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2:
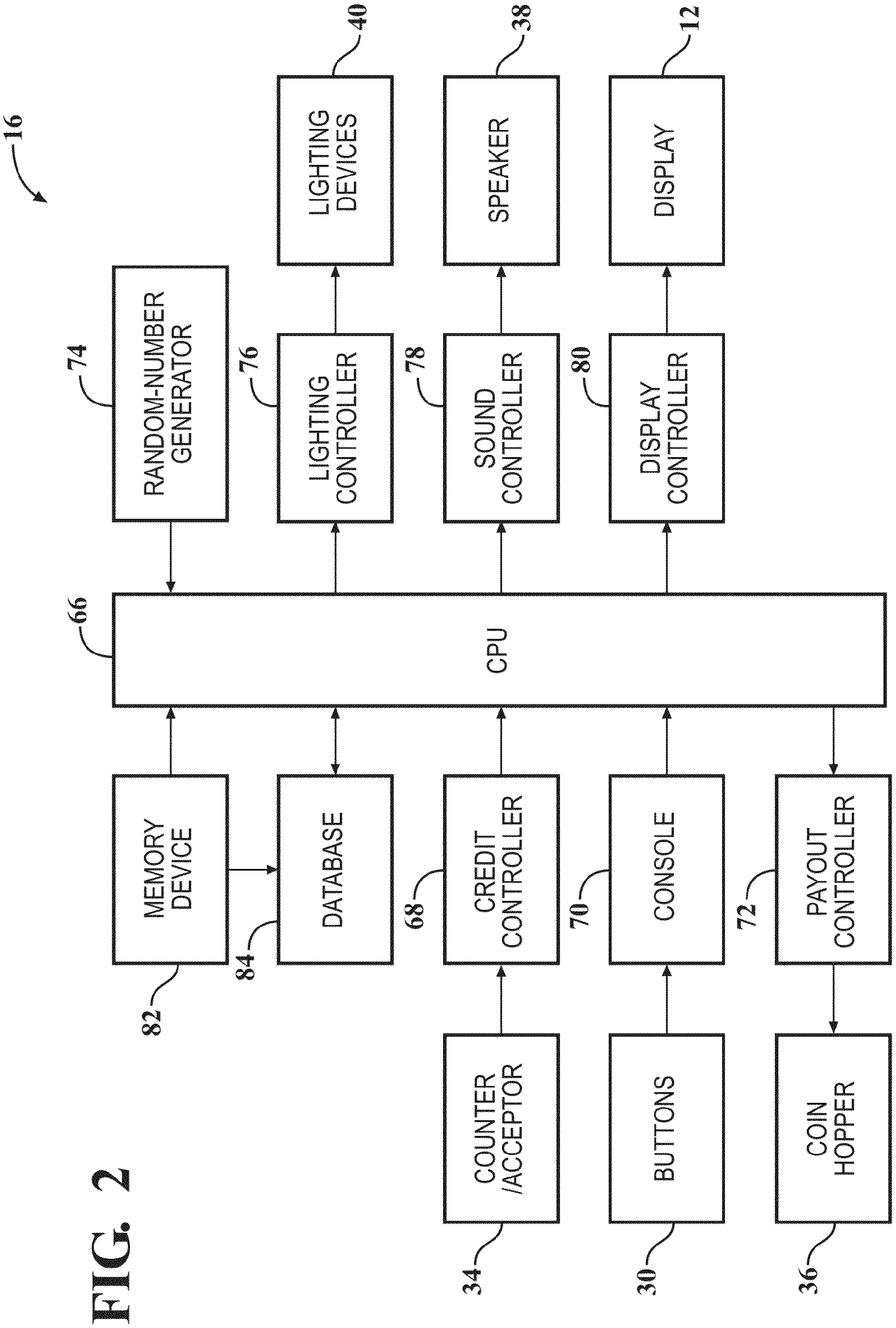
FIG. 2 is a schematic representation of the gaming machine shown in FIG. 1.

FIG. 1 is a perspective view of an exemplary gaming machine 10. FIG. 2 is a schematic representation of the gaming machine 10. A preferred embodiment of the present invention is a video gaming machine preferably installed in a casino. In the illustrated embodiment, the gaming machine 10 includes a display device 12 for displaying a plurality of games, a user input device 14 to enable a player to interface with the gaming machine 10, and a gaming controller 16 that is operatively coupled to the display device 12 and the user input device 14 to enable a player to play games displayed on the display device 12. The gaming machine 10 also includes a box-shaped modular cabinet assembly 18 that is configured to support display device 12, user input device 14, and/or gaming controller 16 from a gaming stand 20 and/or a supporting surface 22. One such cabinet is disclosed in commonly owned US Patent Application Publication No. 2010/0087259 (Ser. No. 12/287,428), filed Oct. 8, 2008, which is hereby incorporated by reference.

Cabinet assembly 18 includes a first cabinet, i.e. an upper cabinet 24, and a second cabinet, i.e. a lower cabinet 26. The display device 12 is coupled to the upper cabinet 24, and is positioned within the upper cabinet 24 such that the display device 12 is accessible by the player. The user input device 14 is coupled to the lower cabinet 26 such that the user input device 14 may be accessed by the player. Moreover, the user input device 14 is coupled to a top surface 28 of the lower cabinet 26 such that the user input device 14 is oriented towards the player to enable the player to easily operate the user input device 14 to facilitate play of the games displayed on the display device 12. In one embodiment, the gaming controller 16 is positioned within the cabinet assembly 18. Alternatively, the gaming controller 16 may be separated from the cabinet assembly 18, and connected to components of the gaming machine 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 30, a coin slot 32, and/or a bill acceptor 34. Coin slot 32 includes an opening that is configured to receive coins and/or tokens deposited by the player into the gaming machine 10. The gaming machine 10 converts a value of the coins and/or tokens to a corresponding amount of gaming credits that are used by the player to wager on games played on the gaming machine 10.

The bill acceptor 34 includes an input and output device that is configured to accept a bill, a ticket, and/or a cash card into the gaming machine 10 to enable an amount of gaming credits associated with a monetary value of the bills, ticket, and/or cash card to be credited to the gaming machine 10. Moreover, the gaming machine 10 may also utilize a cashless wagering system (not shown), such as a ticket in ticket out (TITO) system (not shown). In one embodiment, the bill acceptor 34 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of the casino cashless system.

A coin tray 36 is coupled to the lower cabinet 26 and is configured to receive a plurality of coins that are dispensed from the gaming machine 10. One or more speakers 38 are installed inside the cabinet assembly 18 to generate voice announcements and/or sound effects associated with game play. The gaming machine 10 also includes one or more lighting devices 40 that are configured to blink and/or change brightness and color in specific patterns to produce lighting effects to enhance a visual gaming experience for the player.

In one embodiment, the input buttons 30 include a plurality of BET switches 42 for inputting a wager on a game, a plurality of selection switches 44 for selecting a betting line and/or card, a MAXBET switch 46 for inputting a maximum wager, a PAYOUT switch 48 for ending a gaming session and dispensing accumulated gaming credits to the player, and a start button, i.e. a SPIN/DEAL button 50 to initiate an output of a game.

In the illustrated embodiment, the BET switches 42 include five switches from 1BET to 5BET to enable a player to wager between a minimum bet up to 5× minimum bet. Each selection switch 44 corresponds to a betting line such as, for example, a payline and/or symbol for a reel game, one or more cards for a card game, and/or a symbol for a roulette game, to enable a player to associate a wager with one or more betting lines. The MAXBET switch 46 enables a player to input the maximum bet that a player can spend against one spin of a game. The PAYOUT switch 48 enables a player to receive the amount of money and/or credits awarded to the player during a gaming session, which has been credited onto the gaming machine 10.

The gaming machine 10 may also include a player tracking device 52 that is coupled to the gaming controller 16 for identifying the player and/or a player tracking account that is associated with the player. The player tracking account may include, but is not limited to, gaming credits available to the player for use in playing the gaming machine 10. The player tracking device 52 is configured to communicate player account information between a player tracking controller (not shown) and the gaming machine 10. For example, the player tracking device 52 may be used to track bonus points and/or credits awarded to the player during a gaming session and/or track bonus and/or credits downloaded to the gaming machine 10 from the player tracking system.

The player tracking device 52 is coupled to the cabinet assembly 18 and includes a player identification card reader 54, a data display 56, and a keypad 58. The player identification card reader 54 is configured to accept a player tracking card (not shown) inserted by the player, and read information contained on the player tracking card to identify the player account information. The player identification card reader 54 may include, but is not limited to, a barcode reader, a magnetic card reader, and/or a radio frequency identification (RFID) card reader. The keypad 58 is configured to accept a user selection input such as, for example, a unique player personal identification number (PIN) to facilitate enabling the gaming machine 10 to identify the player, and access player account information associated with the identified player to be displayed on the data display 56. In one embodiment, the data display 56 includes a touchscreen panel that includes the keypad 58. Alternatively, the data display 56 and the keypad 58 may be included in display device 12.

In one embodiment, the display device 12 includes a first display 60 and a second display 62. The first display 60 is configured to display a game screen 64 (see below) including indicia and/or symbols for use in a game. The second display 62 is configured to display game play instructions (not shown) for performing the game including, but not limited to, playing instructions, paytables, paylines, betting lines and/or any other information to enable the gaming machine 10 to function as described herein. Moreover, each display 60 and 62 may be configured to display at least a portion of the game screen 64 and/or game play instructions. In one embodiment, first and second displays 60, 62 each include a flat panel display, such as a cathode ray tube display (CRT), a liquid crystal display (LCD), a light-emitting diode display (LED), a plasma display, and/or any suitable visual output device capable of displaying graphical data and/or text to a user. Alternatively, a single component, such as a touch screen, may function as both the display device 12 and as the user input device 14.

Referring to FIG. 2, in one embodiment, the gaming controller 16 includes a processor, i.e. a central processing unit (CPU) 66, a credit controller 68, a console unit 70, a payout controller 72, a random-number generator (RNG) 74, a lighting controller 76, a sound controller 78, a display controller 80, a memory device 82, and a database 84. Memory device 82 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 66 to store, retrieve, and/or execute instructions and/or data.

The CPU 66 executes various programs, and thereby controls other components of the gaming controller 16 according to player instructions and data accepted by the user input device 14. The CPU 66 in particular executes a game program, and thereby conducts a game in accordance with the embodiments described herein. The memory device 82 stores programs and databases used by the CPU 66. Moreover, the memory device 82 stores and retrieves information in the database 84 including image data for producing game images and screens on the display device 12, and temporarily stores variables, parameters, and the like that are used by the CPU 66. In addition, the memory device 82 stores indicia, symbol weights, paytables, and/or winning combination tables which represent relationships between combinations of random numbers and types of awards. In one embodiment, the memory device 82 utilizes RAM to temporarily store programs and data necessary for the progress of the game, and EPROM to store, in advance, programs and data for controlling basic operation of the gaming machine 10, such as the booting operation thereof.

The credit controller 68 manages the amount of player's credits, which is equivalent to the amount of coins and bills counted and validated by the bill acceptor 34. The console unit 70 is coupled to the user input device 14 to monitor player selections received through the input buttons 30, and accept various instructions and data that a player enters through the input buttons 30. The payout controller 72 converts a player's credits to coins, bills, or other monetary data by using the coin tray 36 and/or dispense a credit voucher via the bill acceptor 34.

The lighting controller 76 controls one or more lighting devices 40 to blink and/or change brightness and color in specific patterns in order to produces lighting effects associated with game play. The sound controller 78 controls speakers 38 to output voice announcements and sound effects during game play. The display controller 80 controls the display device 12 to display various images on screens preferably by using computer graphics and image data stored in the memory device 82. More specifically, the display controller 80 controls video reels in a game screen displayed on the first display 60 and/or the second display 62 by using computer graphics and image data.

Random-number generator (RNG) 74 generates and outputs random numbers to the CPU 66 preferably at the start of each game. The CPU 66 uses the random numbers to determine an outcome of the primary games, anticipation events, bonus features, and/or secondary games. For example, if the primary game is a video slot game, the CPU 66 uses the RNG 74 to randomly select an arrangement of symbols to be displayed on video reels. Moreover, the CPU 66 generally uses random numbers generated by the RNG 74 to play the primary games, to initiate anticipation events, bonus features, and/or secondary games, and to determine whether or not to provide an award to a player. In addition, the CPU 66 generates game outcomes including combinations of random numbers, and compares the generated combinations with winning combinations stored in the winning combination table to determine if the generated outcome is a winning outcome that is associated with a type of award.

For example, if the primary game is a video slot game, the CPU 66 uses the RNG 74 to randomly select an arrangement of symbols to be displayed on the video reels.

The CPU 66 generally uses the random numbers to play the primary and secondary games and to determine whether or not to provide an award to a player at random in the following manner. The CPU 66 retrieves the random numbers from a winning combination table stored in the memory device 82. The winning combination table represents relationship between combinations of random numbers and types of awards. For example, the CPU 66 uses the RNG 74 to randomly select an arrangement of symbols to be displayed on video reels. Moreover, the CPU 66 generally uses random numbers generated by the RNG 74 to play the primary games, to initiate bonus features, and/or secondary games, and to determine whether or not to provide an award to a player. In addition, the CPU 66 generates game outcomes including combinations of random numbers, and compares the generated combinations with winning combinations stored in the winning combination table to determine if the generated outcome is a winning outcome that is associated with a type of award.

The lighting controller 76 controls one or more lighting devices 40. The lighting controller 76 thereby causes the lighting devices 40 to blink and/or change brightness and color in specific patterns in order to produces lighting effects.

The display controller 80 controls the displays 60, 62 to display various images on screens preferably by using computer graphics and image data stored in the ROM 44. The display controller 80 in particular controls video reels in a game screen displayed on the second display 12 by using computer graphics and the image data. The display controller 80 further controls video reels in different manners depending on whether a round of game is in a normal or bonus mode.

It should be noted that the above described gaming machine 10 is for exemplary purposes only. The present invention is not limited to any particular gaming machine 10 and/or game. The gaming machine 10 may also include other features. For example, the gaming machine 10 may include a player tracking device (not shown) which is connected to a player tracking system. The gaming machine 10 may also utilize a cashless wagering system (not shown), such as a ticket in ticket out (TITO) system (not shown) and may include a player tracking device (not shown).

Figure 3A:
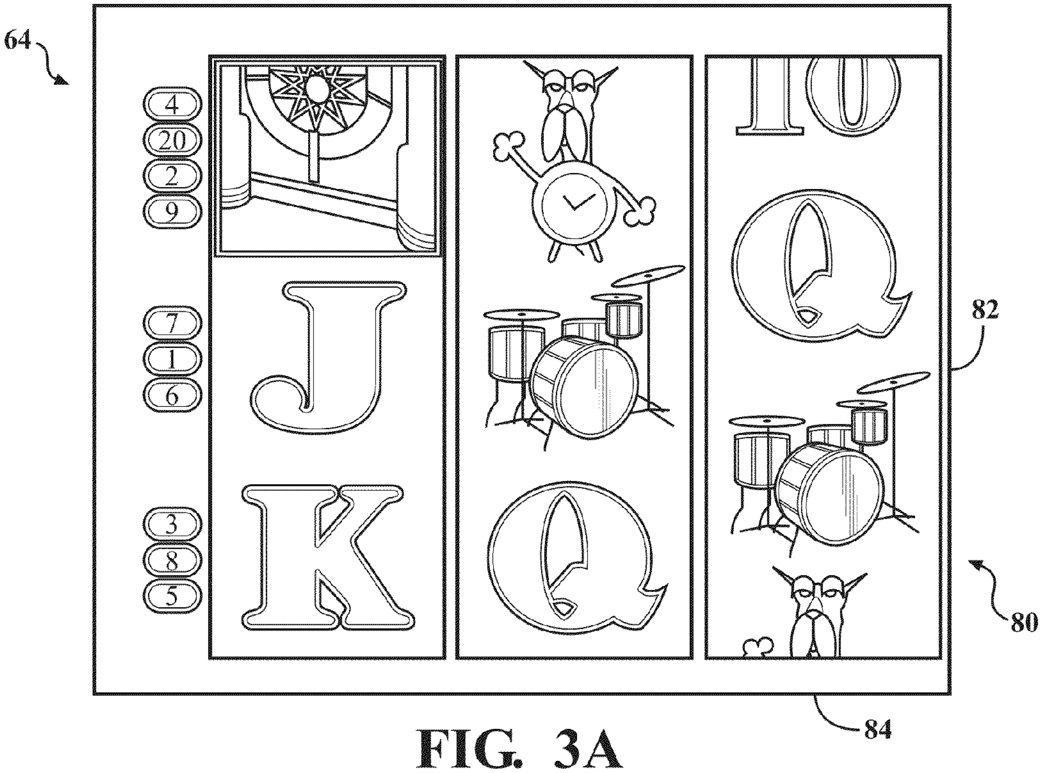
FIG. 3A is a first graphical display of a video slot game with a video having a stack of similar game symbols, according to an embodiment of the present invention.
Figure 3B:
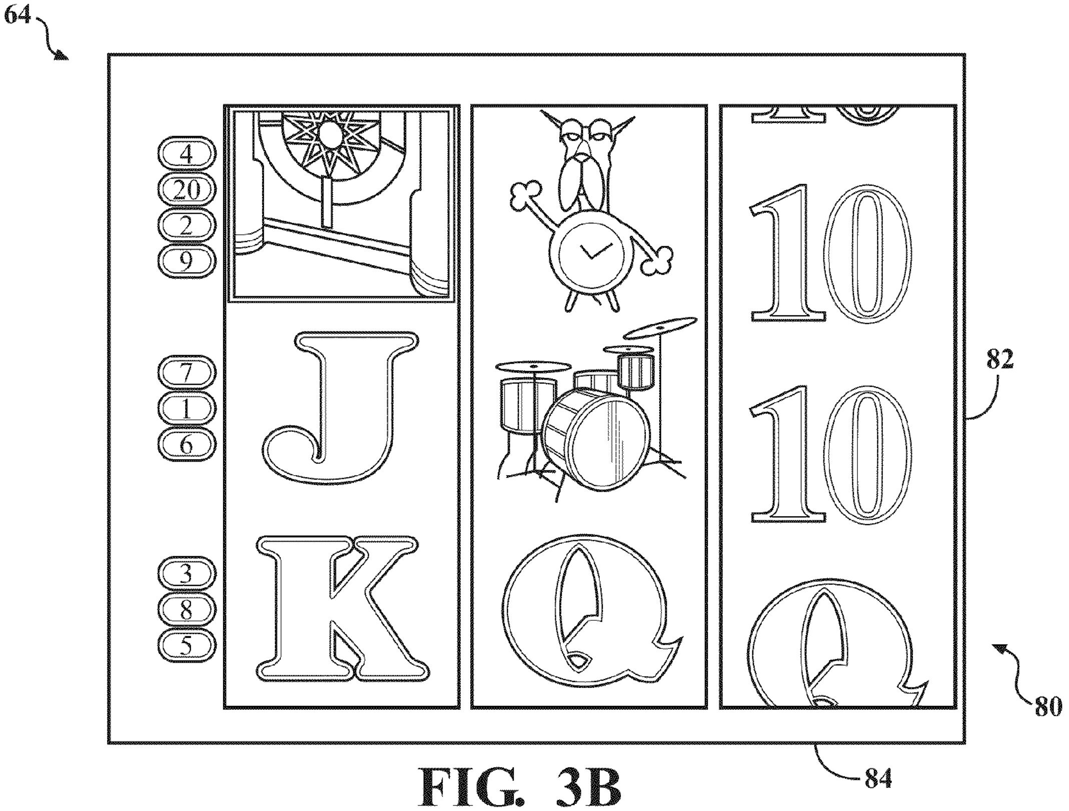
FIG. 3B is a second graphical display of the video slot game of FIG. 3A, according to an embodiment of the present invention.
Figure 3C:
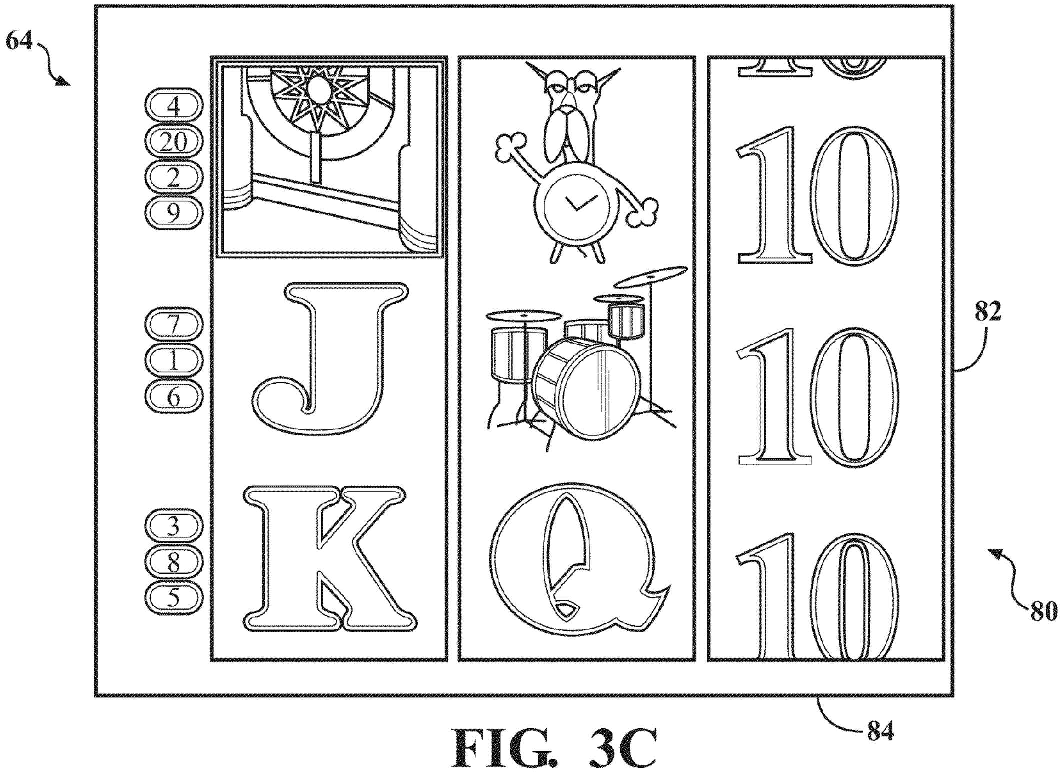
FIG. 3C is a third graphical display of the video slot game of FIG. 3A, according to an embodiment of the present invention.
Figure 3D:
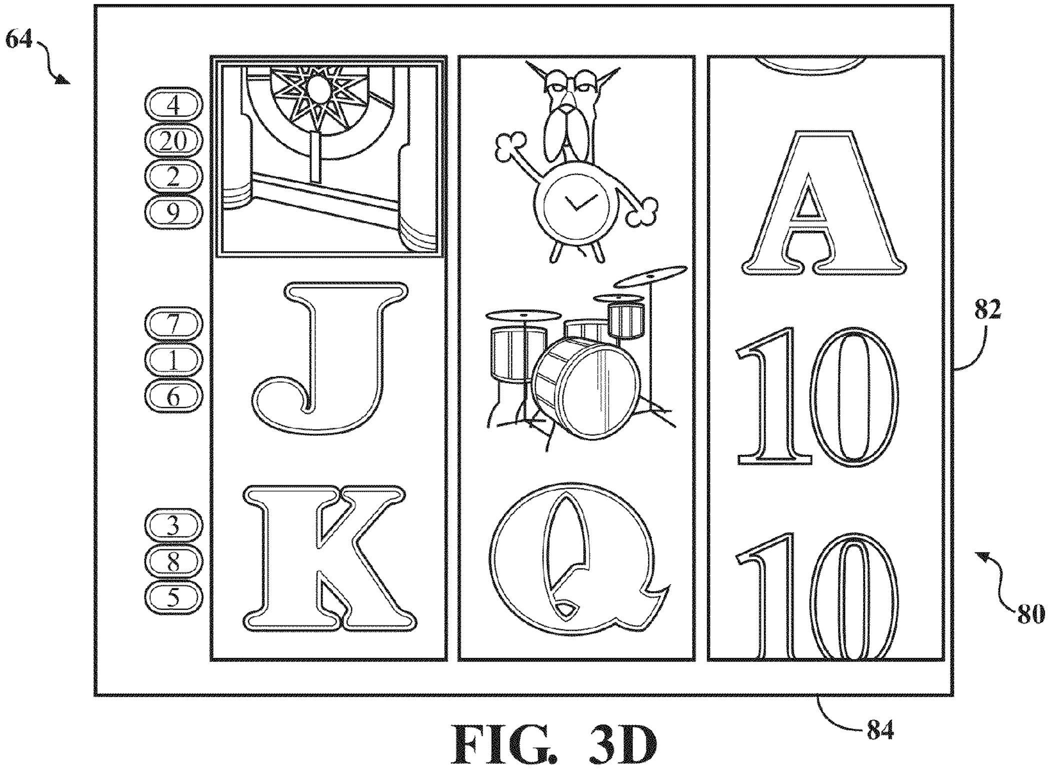
FIG. 3D is a fourth graphical display of the video slot game of FIG. 3A, according to an embodiment of the present invention.

The game controller 16 displays the video slot game on the display 12. FIG. 3A is an exemplary graphical display of the slot game 76 that is displayed by the gaming machine 10. In the illustrated embodiment, the game controller 16 is configured to display the game on the display device 12.

In general, during play of the game, the game controller 12 randomly selects a plurality of game elements 80 such as, for example, video reel symbols, from a predefined set of possible game elements to be displayed on the display device 12. The game controller 12 displays the plurality of game elements 80 in a grid 82 having a plurality of cells 84 defined by rows and/or columns. In one embodiment, the grid 82 includes 3 columns or reels with 3 cells per reel, respectively (a "3×3" arrangement). Alternatively, other video reel arrangements may be used, such as 4-5-5-5-4, 3-4-3-4-3, or 4-5-4-5-4 configurations or configurations with the same number of cells per column, such as 3×5, 3×4, 4×5, or 5×5 configurations.

The video slot game is generally first played in a conventional manner. The player makes a wager, which may be based on a predetermined denomination and a selected number of paylines. The reels are spun and game symbols or elements are randomly chosen for each cell. If a predetermined pattern of elements 80 are randomly chosen for each cell 84 on a played payline, the player may be awarded a payout based on the selected payline, the wager, and a predetermined paytable. Moreover, the player may be awarded a payout if the combination of elements associated with a selected payline is a winning combination. In addition, a player may receive a bonus feature and/or a bonus game based on the combination of elements associated with the selected payline. Many variations to the above described general play of a video slot game fall within the scope of the present invention. Such video slot games are well-known in the art, and are therefore not further discussed.

In general, the present invention relates to “stacked” symbols, i.e., the appearance of a plurality of the same symbols which are adjacent on the same reel. The number of stacked symbols could be two, three, or more. Additionally, the number of stacked symbols could be greater than the number of rows. For example, if the number of rows in the grid 82 is three, the number of stacked symbols could be 4 or more. In the illustrated embodiment, when the stacked symbols are being displayed, i.e., while the reels are spinning and when the reels are stopped, they are overlaid with a single (or unitary) graphic overlay.

If the slot game is a mechanical reel game, the graphic overlay may be displayed using a separate display capable of displaying at least partially opaque and/or at least partly translucent images over the reels.

In one aspect of the present invention, the graphic overlay may be used to provide visual emphasis while the first one of the reels is spinning, and if, the one or more of the stacked symbols appear in the outcome of the slot game.

In one embodiment of the present invention, the graphic overlay may be opaque, such that the underlying symbols are not visible when the reels are spinning and/or when the reels have stopped.

In another embodiment of the present invention, the graphic overlay may be translucent such that the underlying symbols are (partially) visible or discernible.

In still another embodiment of the present invention the graphic overlay may be partially opaque, partially transparent, and/or partially translucent.

In one embodiment of the present invention, the graphic image initially appears while the one of the reels is spinning and a first one of the game symbols in the stack of adjacent, similar symbols appears in the grid and expands as the other symbol(s) in the stack of adjacent, similar symbols appear in the grid. The graphic overlay collapses as the last one of the game symbols in the stack of adjacent, similar symbols disappears from the grid.

In one aspect of the present invention, the controller 12 may award a bonus award as a function of one or more of the similar symbols appearing in the outcome of the game. The bonus award may be an award of credits, free spins, a secondary game or a progressive award.

In another aspect of the present invention, stacked symbols may appear on one or two or more adjacent reels. In one embodiment, each reel may utilize the same graphic overlay. In another embodiment, as explained below, each reel utilizes a separate, distinct graphic overly, which may be aligned to make a single unitary image. The appearance of the single unitary image in the outcome of the slot game may trigger a bonus, i.e., a bonus award, a bonus game, a number of free spins, a progressive award or some other award.

First Embodiment

With reference to FIGS. 3A-3D and 4A-4D, in one embodiment, the graphic overlay or full reel image is utilized to provide higher visual impact. In the illustrated, the stacked symbols are an image of a “10”. During reel spin, if consecutive symbols, i.e., “10” are placed next to each other on the same reel, a feel reel version of that or another symbol overlays all of the stacked symbols. For purposes of explanation FIGS. 3A-3D correspond to FIGS. 4A-4D, however, the overlay graphic or symbol is removed. In this embodiment, the third reel includes a stack of four “10” symbols. There are 3 rows in the grid 82. Thus, the stack is larger than the column (see FIGS. 3A-4D).

In this embodiment, the graphic overlay is an image of a guitar 86. The height of the graphic image is the same as the height of a column, i.e., three.

Figure 4A:
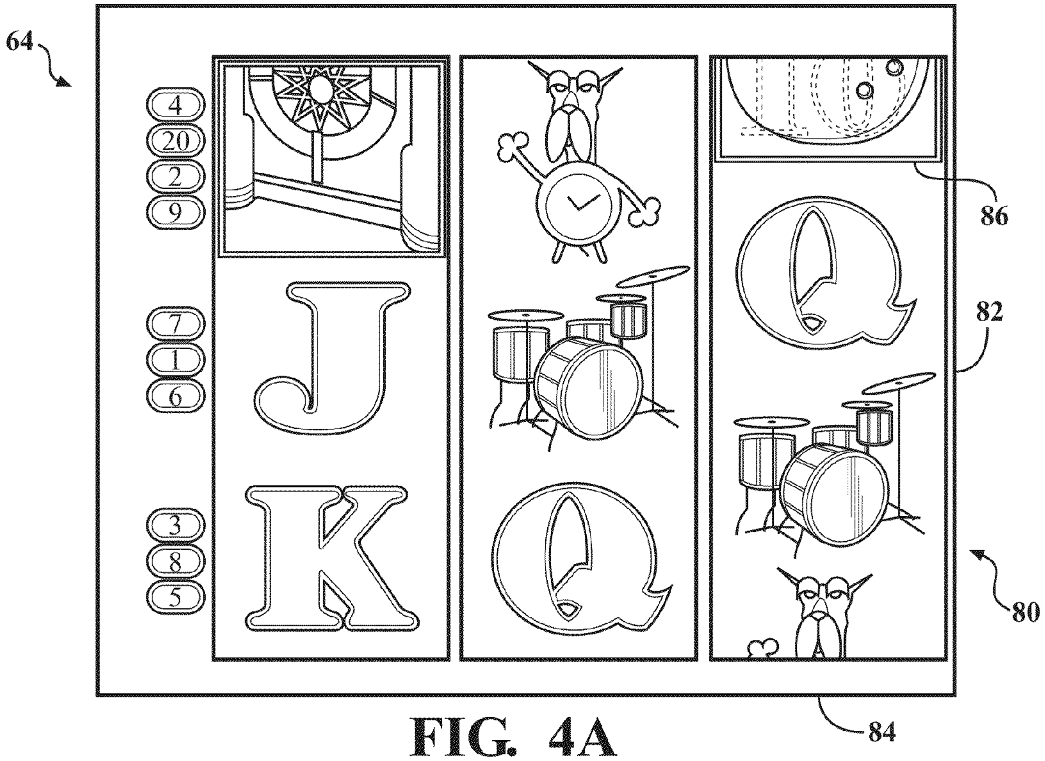
FIG. 4A is a first graphical display of a video slot game with a video reel having a stack of similar game symbols with a graphical overlay image, according to an embodiment of the present invention.
Figure 4B:
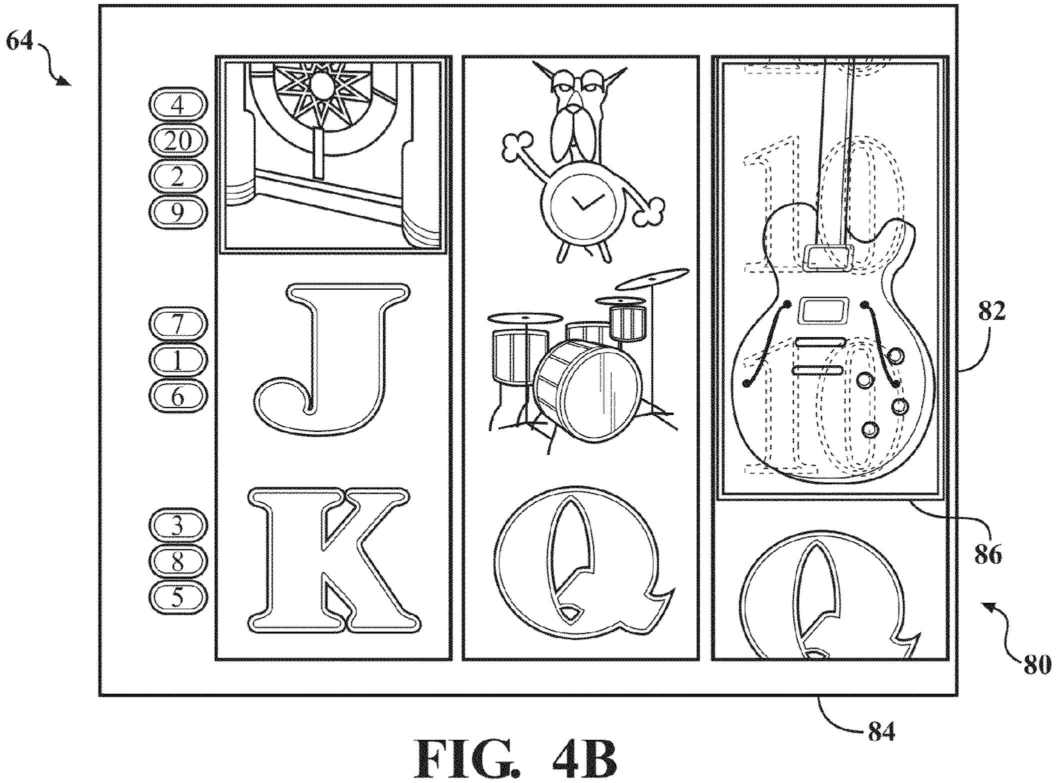
FIG. 4B is a second graphical display of the video slot game of FIG. 4A, according to an embodiment of the present invention.
Figure 4C:
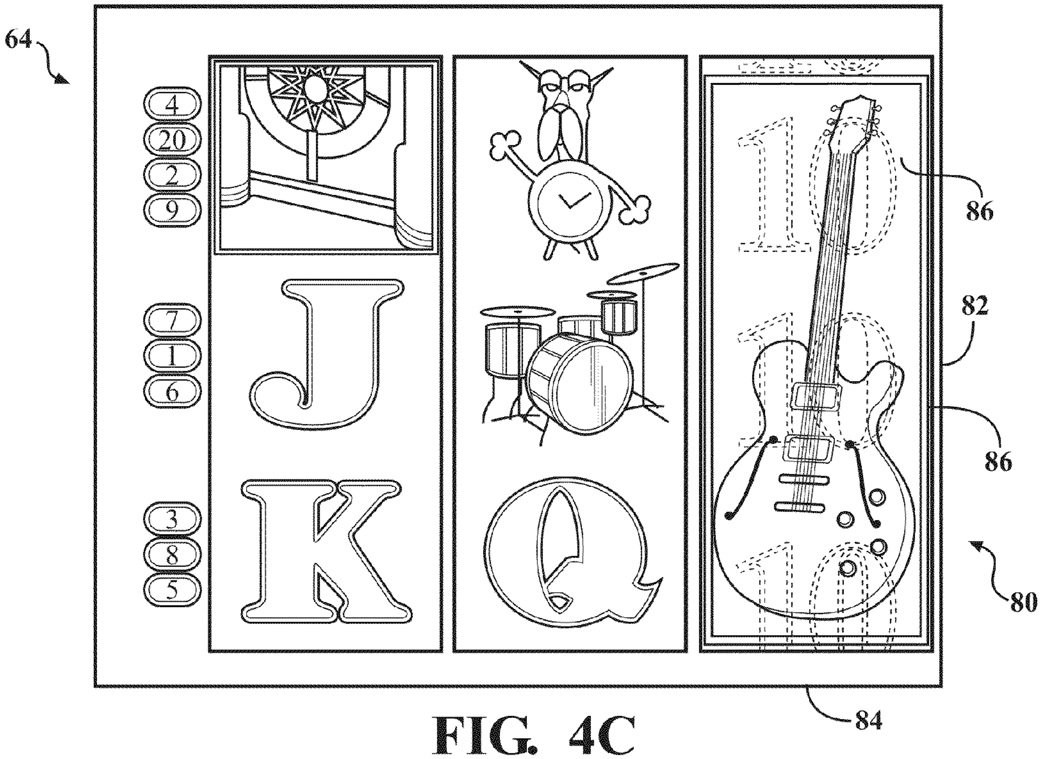
FIG. 4C is a third graphical display of the video slot game of FIG. 4A, according to an embodiment of the present invention.
Figure 4D:
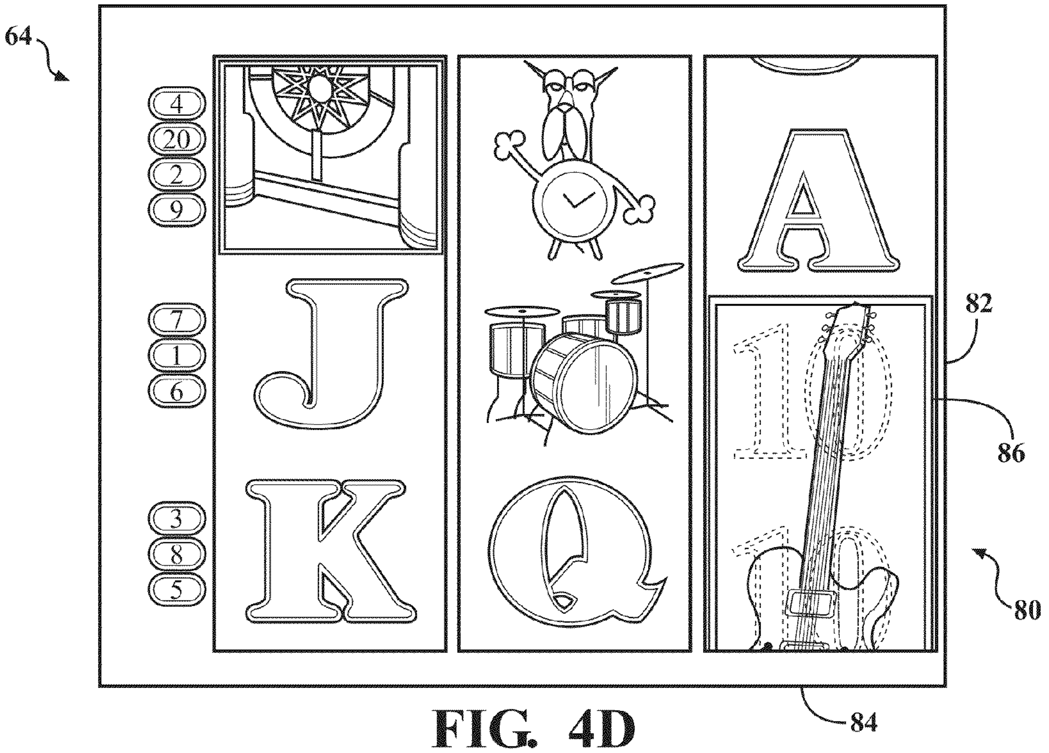
FIG. 4D is a fourth graphical display of the video slot game of FIG. 4A, according to an embodiment of the present invention.

With specific reference to FIG. 4A, as the first of the stacked images appears in the grid, the graphic overlay slides into view as well. As shown in FIGS. 4B and 4C, the graphic overlay continues moving with the first stacked symbol until it completely fills or overlays the third reel.

If the number of stacked symbols is equal to the number of rows, i.e., the size of the reel, then the graphic overlay will continuing moving off with the underlying symbols.

However, if the number of stacked symbols is larger than the number of rows, then the graphic overlay will remain stationary (as shown in FIG. 4C) while the underlying symbols are moving underneath until the last symbol in the stack of symbols appears. Then the graphic overlay will “stick” to the last symbol in the stack and move off the display with it.

Second Embodiment

Figure 5A:
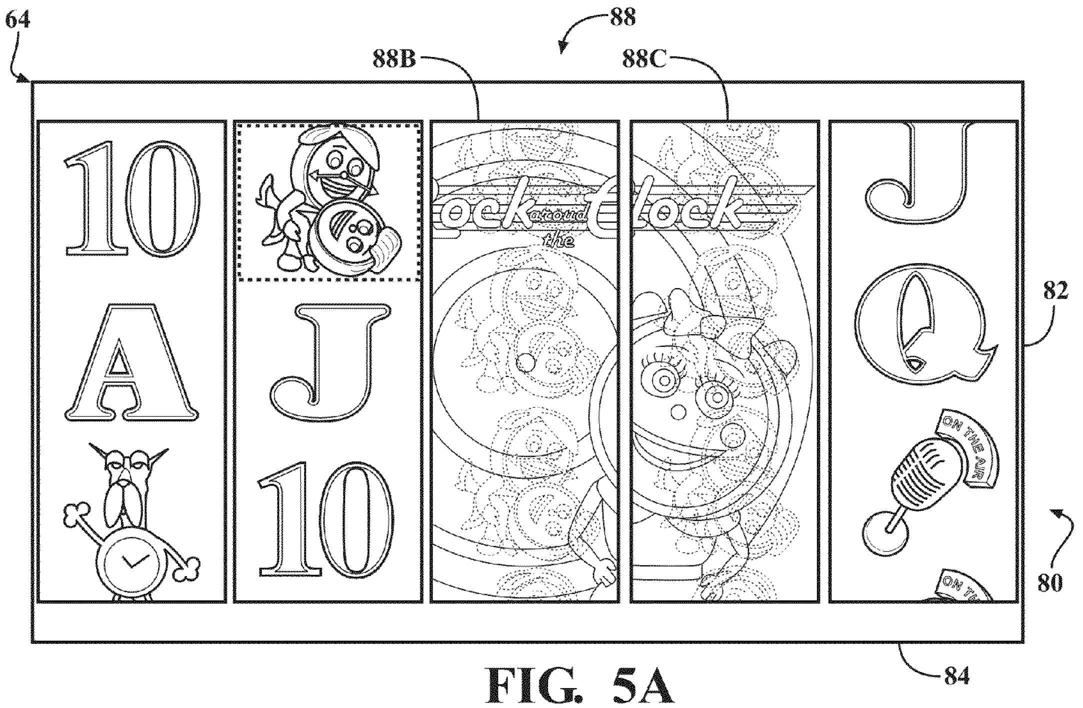
FIG. 5A is a first graphical display of a video slot game with a plurality of video reels having a stack of similar game symbols with a graphical overlay image, according to an embodiment of the present invention.
Figure 5B:
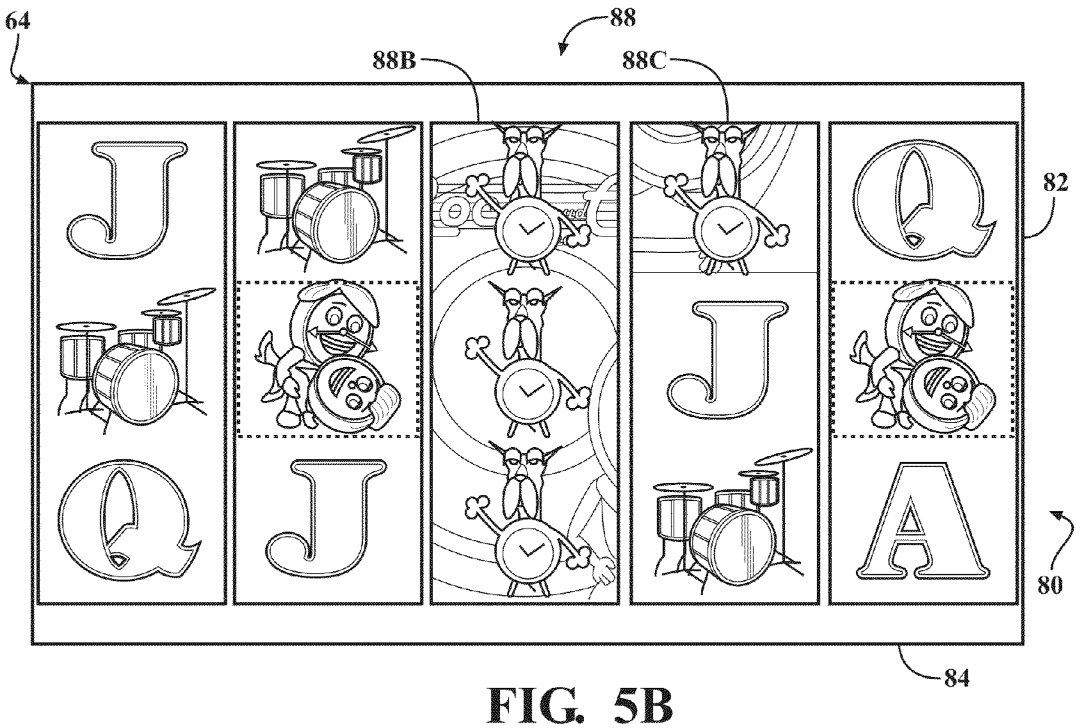
FIG. 5B is a second graphical display of the video slot game of FIG. 5A, according to an embodiment of the present invention.
Figure 5C:
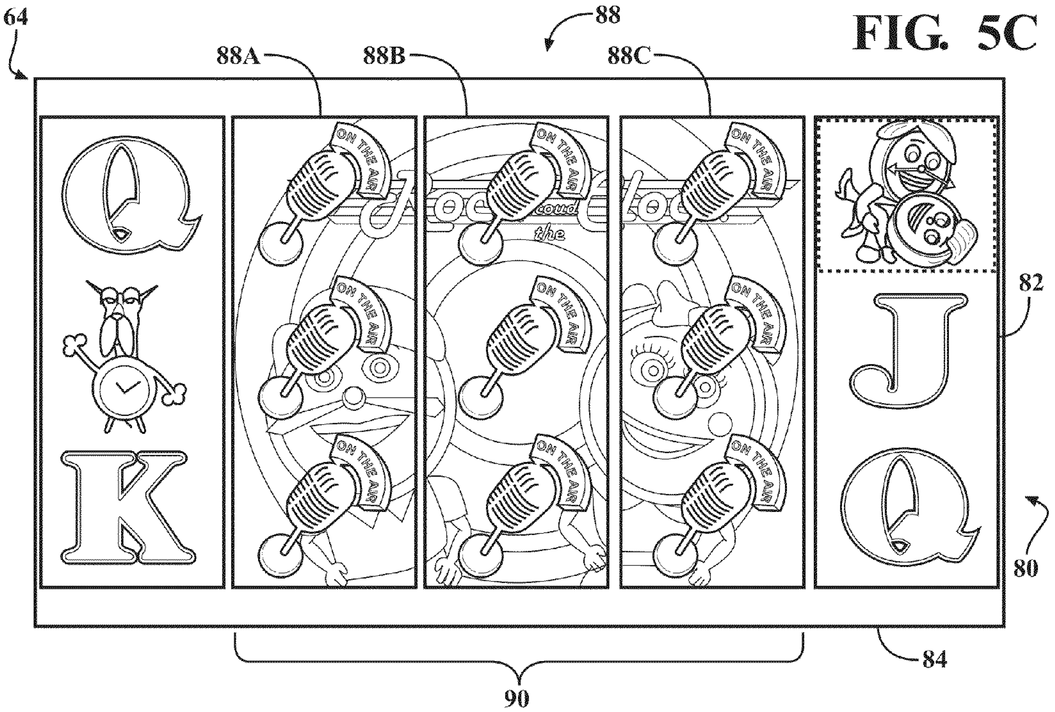
FIG. 5C is a third graphical display of the video slot game of FIG. 5A, according to an embodiment of the present invention.

With reference to FIGS. 5A-5C, a video slot game having 5 reels and 3 rows is shown. Full reel overlays 88 are used on reels 2, 3, and 4. Each reel has a unique graphic overlay 88A, 88B, 88C, which are displayed on top of stacked symbols. The graphic overlays 88A, 88B, 88C together form a single unitary image 90. In the illustrated embodiment, the image 90 comprises a record. While the reels are spinning, the graphic overlays will be “dragged” on and off the screen with the underlying stacked symbols.

In the illustrated embodiment, each graphic overlay 88A, 88B, 88C has an opaque expanding frame (see below), and an inner portion. While the reels are spinning, the inner portion (when they appear) are translucent such that the underlying symbols are at least partly visible. When the reels stop, if the graphic overlays (or part thereof) 88A, 88B, 88C appear on the display, the inner portion may be opaque such that the underlying symbols are not visible.

In one embodiment, the appearance of the single unitary image 90 in the outcome of the game will result in the award of a bonus, such as a progressive award.

Third Embodiment

With reference to FIGS. 6A-6F, the graphic overlay may be used to enhance or signify a special event signified by the stacked symbols. In this embodiment, the graphic overlay comprises animated indicia such as an expanding frame 92.

Before, during, or after any reel spin event on the gaming machine 10, the animated indicia 92 will appear to denote a block of special, enhanced, or important symbols, i.e., stacked symbols contained on the reels.

In the illustrated embodiment, animated indicia shown as whenever a “block” of Action Stacked Symbols appear on the reels that contain a special “Jackpot” symbol 94 (shown as a guitar in FIG. 6F) during and after the reel spin. The frame 92 animates into existence, remains on the screen as the Action Stacked Symbols 94 continue to appear during the spin, and then animates out of existence. In the illustrated embodiment, the entire frame 92, i.e., all four sides appear on the display with the first symbol in the stack of symbols, and expands with the stack (see FIGS. 6B-6F). When the Action Stacked Symbol 94 completes its appearance in the reel window, the reel frame 92 surrounding the Action Stacked Symbol 94 collapses as the last Action Stacked Symbol 94 passes through the reel window.

The process is repeated anytime the Action Stacked Symbols with the Jackpot symbol appears in the reel window.

Figure 6A:
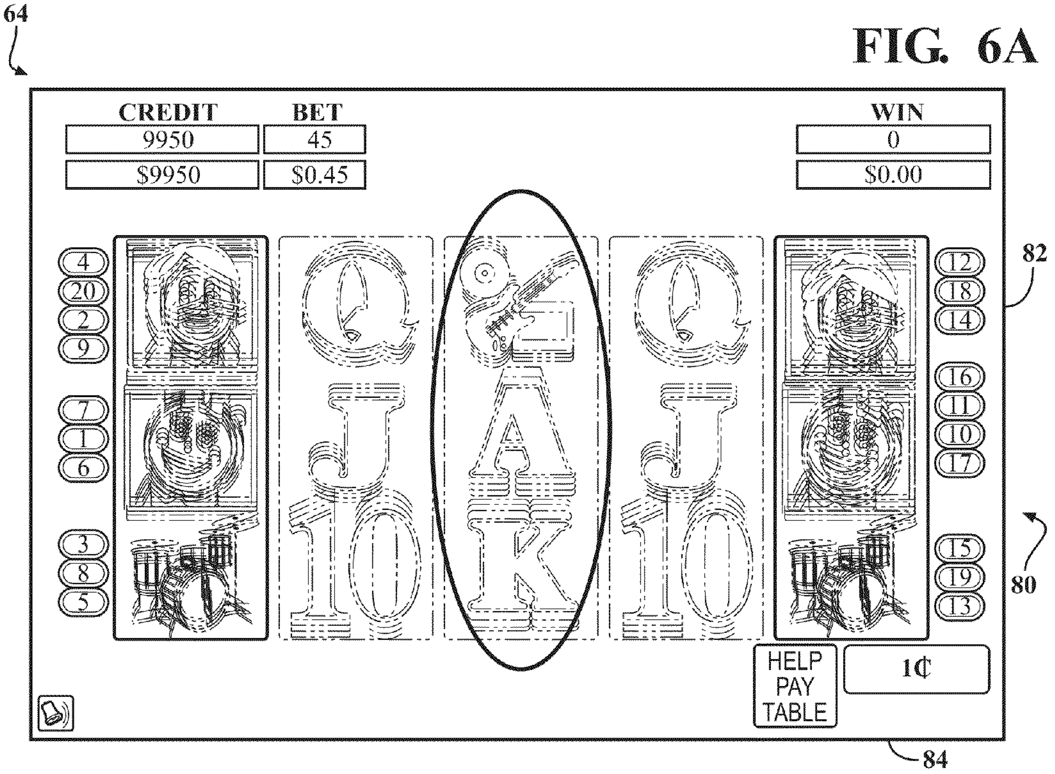
FIG. 6A is a first graphical display of a video slot game with a plurality of video reels having a stack of similar game symbols with a frame-type graphical overlay image, according to an embodiment of the present invention.
Figure 6B:
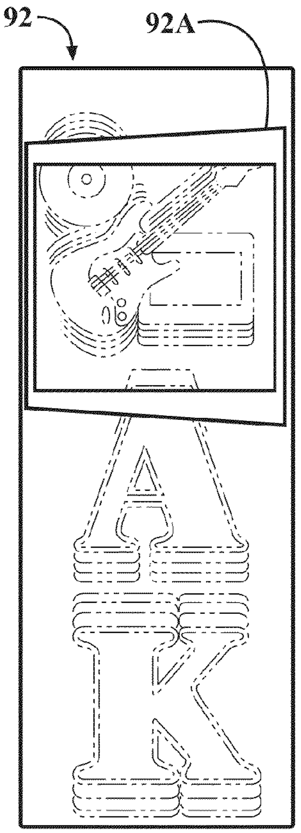
FIG. 6B is a first graphical display of one of the reels of the video slot game of FIG. 6A, according to an embodiment of the present invention.
Figure 6C:
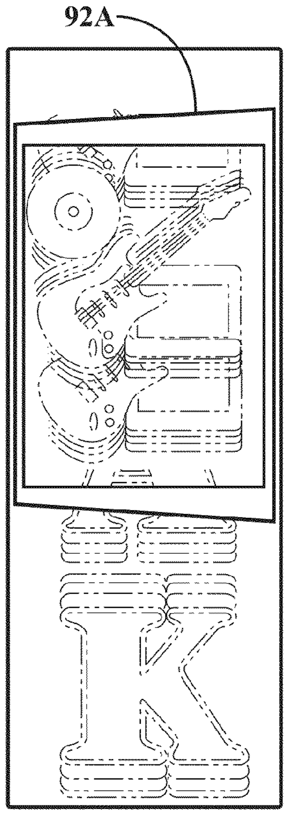
FIG. 6C is a second graphical display of the one of the reels of the video slot game of FIG. 6A, according to an embodiment of the present invention.
Figure 6D:
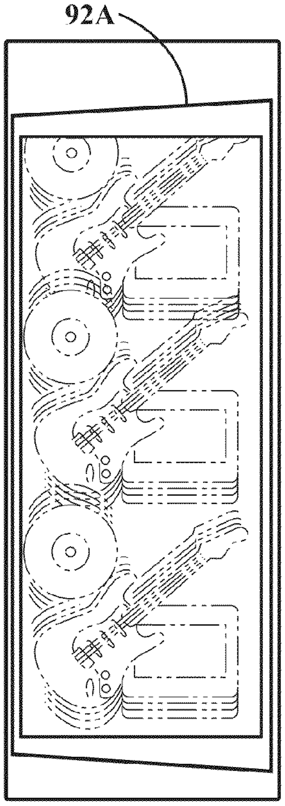
FIG. 6D is a third graphical display of the one of the reels of the video slot game of FIG. 6A, according to an embodiment of the present invention.
Figure 6E:
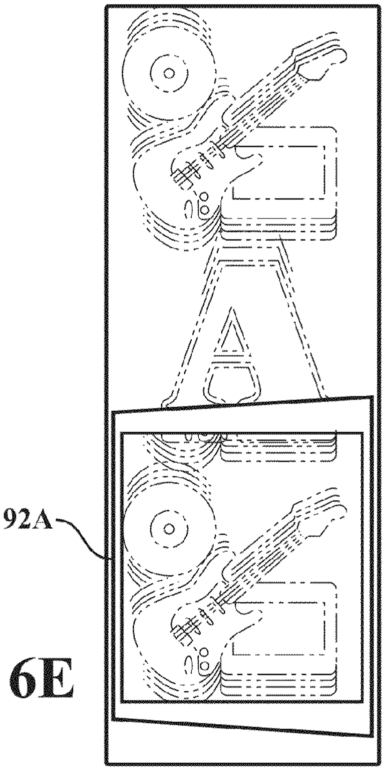
FIG. 6E is a fourth graphical display of the one of the reels of the video slot game of FIG. 6A, according to an embodiment of the present invention; and, FIG. 6F is a second graphical display of the video slot game of FIG. 6A, according to an embodiment of the present invention.
Figure 6F:
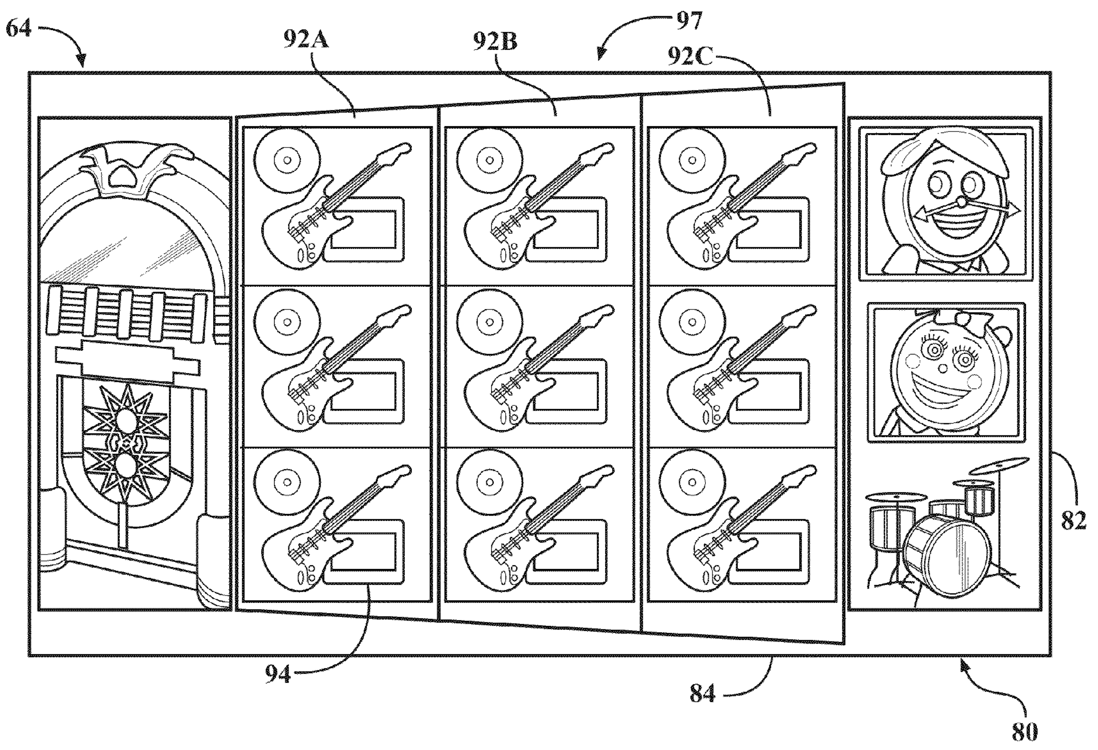

The reel frames do not need to be the same size or shape. As shown in FIG. 6F, to maintain a 1950's theme, the reel frames 92A, 92B, 92C, though they function the same, increase in size from reel 2 to reel 4.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of providing a slot game to a player, the slot game including a plurality of reels, each reel having a plurality of game symbols in a predetermined order, including the steps of:

allowing the player to make a wager on the game;

initiating the game and responsively spinning the reels, the reels being displayed in a grid comprised of a plurality of symbol positions, the spinning reels being visible in the grid during play of the game;

displaying a first one of the reels containing a stack of adjacent, identical symbols and displaying the stack of adjacent, identical symbols with a first single graphic overlay as the stack of adjacent, identical symbols appears in the grid, the first single graphic overlay extending across the stack of adjacent, identical symbols as the stack of adjacent, identical symbols is moving through the grid, the stack of adjacent, identical symbols including a first number of symbols, the first single graphic overlay extending across a second number of symbols that is less than the first number of symbols;

randomly determining an outcome of the game and responsively stopping the reels to display the outcome of the game, the outcome of the game including one of the symbols from a corresponding reel being displayed at each symbol position; and, awarding the player an award as a function of the wager, the outcome of the game and a predetermined paytable.

2. A method, as set forth in claim 1, wherein the first single graphic overlay is moved with the stack of adjacent, identical symbols while the first one of the reels is spinning.

3. A method, as set forth in claim 2, wherein the first single graphic overlay initially appears while the first one of the reels is spinning and a first one of the game symbols in the stack of adjacent, identical symbols appears in the grid, expands to a full height as the other symbol(s) in the stack of adjacent, identical symbols appear in the grid, and is held in position as the stack of adjacent, identical symbols is spun through the grid.

4. A method, as set forth in claim 3, wherein the first single graphic overlay collapses as the last one of the game symbols in the stack of adjacent, identical symbols disappears from the grid.

5. A method, as set forth in claim 4, wherein the symbol positions are arranged in columns, the at least one reel being associated with one of columns, the one of the columns having n symbol positions.

6. A method, as set forth in claim 5, wherein the stack of adjacent, identical symbols includes n symbols.

7. A method, as set forth in claim 5, wherein the stack of adjacent, identical symbols includes at least n+1 symbols.

8. A method, as set forth in claim 5, including the step of awarding a bonus award as a function of one or more of the identical symbols appearing in the outcome of the game.

9. A method, as set forth in claim 8, wherein the bonus award is a progressive award.

10. A method, as set forth in claim 3, wherein the single graphic overlay is a frame.

11. A method, as set forth in claim 1, wherein the first single graphic overlay is visible when at least one of the stacked, identical symbols are in the outcome of the game.

12. A method, as set forth in claim 1, wherein the first single graphic overlay is opaque.

13. A method, as set forth in claim 1, wherein the first single graphic overlay is partially transparent.

14. A method, as set forth in claim 1, wherein a second one of the reels contains a second stack of adjacent, identical symbols, the stack of adjacent identical symbols being displayed with a second single graphic overlay.

15. A method, as set forth in claim 14, wherein the first one of the reels is adjacent the second one of the reels.

16. A method, as set forth in claim 15, wherein the first and second single graphic overlays form a single image.

17. A method, as set forth in claim 16, wherein a bonus award is awarded if the single image appears in the outcome of the game.

18. A gaming machine for providing a slot game to a player, comprising:

a display device configured to display a plurality of reels, each reel having a plurality of game symbols in a predetermined order; and, a controller for allowing the player to make a wager on the game, initiating the game and responsively spinning the reels, the reels being displayed in a grid comprised of a plurality of symbol positions, the spinning reels being visible in the grid during play of the game, the controller for displaying a first one of the reels containing a stack of adjacent, identical symbols and displaying the stack of adjacent, identical symbols with a first single graphic overlay as the stack of adjacent, identical symbols appears in the grid, the first single graphic overlay extending across the stack of adjacent, identical symbols as the stack of adjacent, identical symbols is moving through the grid, the stack of adjacent, identical symbols including a first number of symbols, the first single graphic overlay extending across a second number of symbols that is less than the first number of symbols, the controller for randomly determining an outcome of the game and responsively stopping the reels to display the outcome of the game, the outcome of the game including one of the symbols from a corresponding reel being displayed at each symbol position, the controller for awarding the player an award as a function of the wager, the outcome of the game and a predetermined paytable.

19. A gaming machine, as set forth in claim 18, wherein the first single graphic overlay is moved with the stack of adjacent, identical symbols while the first one of the reels is spinning.

20. A gaming machine, as set forth in claim 19, wherein the first single graphic overlay initially appears while the first one of the reels is spinning and a first one of the game symbols in the stack of adjacent, identical symbols appears in the grid and expands to a full height as the other symbol(s) in the stack of adjacent, identical symbols appear in the grid, and is held in position as the stack of adjacent, identical symbols is spun through the grid.

21. A gaming machine, as set forth in claim 20, wherein the first single graphic overlay collapses as the last one of the game symbols in the stack of adjacent, identical symbols disappears from the grid.

22. A gaming machine, as set forth in claim 21, wherein the symbol positions are arranged in columns, the at least one reel being associated with one of columns, the one of the columns having n symbol positions.

23. A gaming machine, as set forth in claim 22, wherein the stack of adjacent, identical symbols includes n symbols.

24. A gaming machine, as set forth in claim 22, wherein the stack of adjacent, identical symbols includes at least n+1 symbols.

25. A gaming machine, as set forth in claim 22, the controller for awarding a bonus award as a function of one or more of the identical symbols appearing in the outcome of the game.

26. A gaming machine, as set forth in claim 25, wherein the bonus award is a progressive award.

27. A gaming machine, as set forth in claim 20, wherein the single graphic overlay is a frame.

28. A gaming machine, as set forth in claim 18, wherein the first single graphic overlay is visible when at least one of the stacked, identical symbols are in the outcome of the game.

29. A gaming machine, as set forth in claim 18, wherein the first single graphic overlay is opaque.

30. A gaming machine, as set forth in claim 18, wherein the first single graphic overlay is partially transparent.

31. A gaming machine, as set forth in claim 18, wherein a second one of the reels contains a second stack of adjacent, identical symbols, the stack of adjacent identical symbols being displayed with a second single graphic overlay.

32. A gaming machine, as set forth in claim 31, wherein the first one of the reels is adjacent the second one of the reels.

33. A gaming machine, as set forth in claim 32, wherein the first and second single graphic overlays form a single image.

34. A gaming machine, as set forth in claim 33, wherein a bonus award is awarded if the single image appears in the outcome of the game.

* * * * *